(12) United States Patent
Winslow

(10) Patent No.: US 11,060,503 B2
(45) Date of Patent: Jul. 13, 2021

(54) YAW PAD ENGAGEMENT FEATURES

(71) Applicant: Wind Solutions, LLC, Sanford, NC (US)

(72) Inventor: Christopher James Winslow, Lemon Springs, NC (US)

(73) Assignee: Wind Solutions, LLC, Sanford, NC (US)

(*) Notice: Subject to any disclaimer, the term of this patent is extended or adjusted under 35 U.S.C. 154(b) by 162 days.

(21) Appl. No.: 16/299,552

(22) Filed: Mar. 12, 2019

(65) Prior Publication Data

US 2019/0285052 A1 Sep. 19, 2019

Related U.S. Application Data

(60) Provisional application No. 62/642,240, filed on Mar. 13, 2018.

(51) Int. Cl.
*F03D 7/02* (2006.01)
*F03D 80/70* (2016.01)
(Continued)

(52) U.S. Cl.
CPC ........... *F03D 7/0244* (2013.01); *F03D 80/70* (2016.05); *F16D 55/02* (2013.01); *F16D 65/092* (2013.01);
(Continued)

(58) Field of Classification Search
CPC ...... F16D 65/18; F16D 2121/04; F16D 55/02; F16D 2055/0062; F16D 2055/0075;
(Continued)

(56) References Cited

U.S. PATENT DOCUMENTS 2,711,729 A * 6/1955 Hofmann ............. A61N 1/3601
601/41
2,821,273 A * 1/1958 Eames .................. F16D 65/853
188/264 F (Continued)

OTHER PUBLICATIONS

Availon United Wind Service, "Yaw Puck," www.availon.com, Oct. 9, 2013.

(Continued)

*Primary Examiner* — Robert A. Siconolfi
*Assistant Examiner* — Mahbubur Rashid
(74) *Attorney, Agent, or Firm* — Leveque Intellectual Property Law, P.C.

(57) ABSTRACT

A yaw brake apparatus includes a first surface disposed on an end of a yaw piston for a wind turbine, the first surface including a first pattern formed by one or more of a plurality of first recesses and a plurality of first protrusions. The yaw brake apparatus may also include a yaw pad including a second surface structurally configured to engage with the first surface and a third surface opposite the second surface that is structurally configured to engage with a slew ring of the wind turbine, the second surface including a second pattern formed by one or more of a plurality of second recesses and a plurality of second protrusions corresponding to one or more of the plurality of first recesses and the plurality of first protrusions on the first pattern such that the first pattern and second pattern fit together when aligned in a predetermined orientation.

18 Claims, 10 Drawing Sheets

(51) Int. Cl.
*F16D 65/092* (2006.01)
*F16D 55/02* (2006.01)
*F16D 65/18* (2006.01)
*F03D 1/00* (2006.01)
*F16D 121/04* (2012.01)
*F16D 125/06* (2012.01)

(52) U.S. Cl.
CPC ............... *F16D 65/18* (2013.01); *F03D 1/00* (2013.01); *F03D 7/0204* (2013.01); *F16D 2121/04* (2013.01); *F16D 2125/06* (2013.01); *F16D 2200/0021* (2013.01); *F16D 2200/0034* (2013.01); *F16D 2250/0069* (2013.01)

(58) Field of Classification Search
CPC .. F16D 2069/004; Y10T 156/10; F16C 39/02; F03D 80/70; F03D 7/0212; F03D 7/0204; F16B 35/04
See application file for complete search history.

(56) References Cited

U.S. PATENT DOCUMENTS

| | | | | |
|---|---|---|---|---|
| 3,042,152 | A * | 7/1962 | Butler | F16D 55/228 188/73.32 |
| 3,729,292 | A * | 4/1973 | Heck | F16F 1/20 428/545 |
| 3,918,555 | A * | 11/1975 | Rath | F16D 65/0006 188/73.37 |
| 3,964,580 | A * | 6/1976 | Hahm | F16D 65/092 188/73.1 |
| 4,248,328 | A * | 2/1981 | Klassen | F16D 65/0006 188/73.43 |
| 4,846,312 | A * | 7/1989 | Sweetmore | F16D 65/092 188/73.1 |
| 5,129,487 | A * | 7/1992 | Kobayashi | F16D 65/092 188/250 B |
| 5,181,588 | A | 1/1993 | Emmons | |
| 5,732,800 | A * | 3/1998 | Spigener | B29C 43/006 188/234 |
| 5,816,901 | A * | 10/1998 | Sirany | B24B 5/065 451/415 |
| 6,279,222 | B1 * | 8/2001 | Bunker | F16D 65/092 29/527.5 |
| 6,367,600 | B1 * | 4/2002 | Arbesman | B21D 28/10 188/250 B |
| 8,310,080 | B2 * | 11/2012 | Ramanujam | F16D 65/092 188/72.4 |
| 2002/0038743 | A1 * | 4/2002 | Yoshimoto | F16D 69/026 188/250 R |
| 2004/0238295 | A1 * | 12/2004 | Pham | F16D 69/04 188/73.1 |
| 2005/0269167 | A1 * | 12/2005 | Iwai | B62L 1/005 188/26 |
| 2005/0269175 | A1 * | 12/2005 | Iwai | B62L 1/005 188/251 A |
| 2006/0278482 | A1 * | 12/2006 | Kahan | F16D 65/092 188/250 G |
| 2006/0289255 | A1 * | 12/2006 | Adams | F16D 65/0971 188/218 XL |
| 2007/0246315 | A1 * | 10/2007 | Bosco, Jr. | F16D 65/0979 188/250 B |
| 2007/0295567 | A1 * | 12/2007 | Adams | F16D 65/0006 188/218 XL |
| 2008/0116023 | A1 * | 5/2008 | Chen | B62L 1/005 188/251 A |
| 2008/0156600 | A1 * | 7/2008 | Eastham | F16D 65/06 188/250 B |
| 2009/0255769 | A1 * | 10/2009 | Kurita | F16D 55/228 188/370 |
| 2010/0065389 | A1 * | 3/2010 | Gilboy | F16D 69/04 188/251 R |
| 2011/0031755 | A1 * | 2/2011 | Numajiri | F16C 17/10 290/55 |
| 2011/0188988 | A1 * | 8/2011 | Wadehn | F16D 65/092 188/250 B |
| 2011/0254281 | A1 * | 10/2011 | Noda | G06F 40/289 705/311 |
| 2012/0027585 | A1 * | 2/2012 | Daniels | F16D 69/04 188/72.4 |
| 2013/0175127 | A1 * | 7/2013 | MacKelvie | F16D 65/092 188/250 B |
| 2015/0012448 | A1 * | 1/2015 | Bleiweiss | G06F 40/289 705/311 |
| 2015/0292583 | A1 * | 10/2015 | Inokuchi | F16D 69/04 188/72.4 |
| 2015/0369311 | A1 * | 12/2015 | Inokuchi | F16D 65/092 188/72.4 |
| 2015/0369312 | A1 * | 12/2015 | Inokuchi | F16D 69/0408 188/72.4 |
| 2016/0091041 | A1 * | 3/2016 | Arbesman | B21J 5/068 188/250 G |
| 2016/0281805 | A1 * | 9/2016 | Kummel | F16D 65/0018 |
| 2016/0333860 | A1 * | 11/2016 | Winslow | F16B 35/04 |
| 2016/0363183 | A1 * | 12/2016 | Arbesman | F16D 55/225 |

OTHER PUBLICATIONS

Paul Dvorak, "No friction pads on these pitch and yaw brakes," www.windpowerengineering.com, Mar. 11, 2011.
Souich Yagi, Nobuyuki Ninoyu, "Technical Trends in Wind Turbine Bearings," NTN Technical Review No. 76, 2008.
VB Seals, Inc., "Wind Turbine Yaw Brake Pucks," www.vbseals.com, downloaded from the internet Mar. 12, 2018.
Wikipedia, "Yaw bearing definition," www.wikipedia.com, downloaded from the internet Mar. 12, 2018.
Wind Warehouse, "Ungraded PEEK Yaw Pad," www.store.windowarehouse.com, downloaded from the internet Mar. 12, 2018.

* cited by examiner

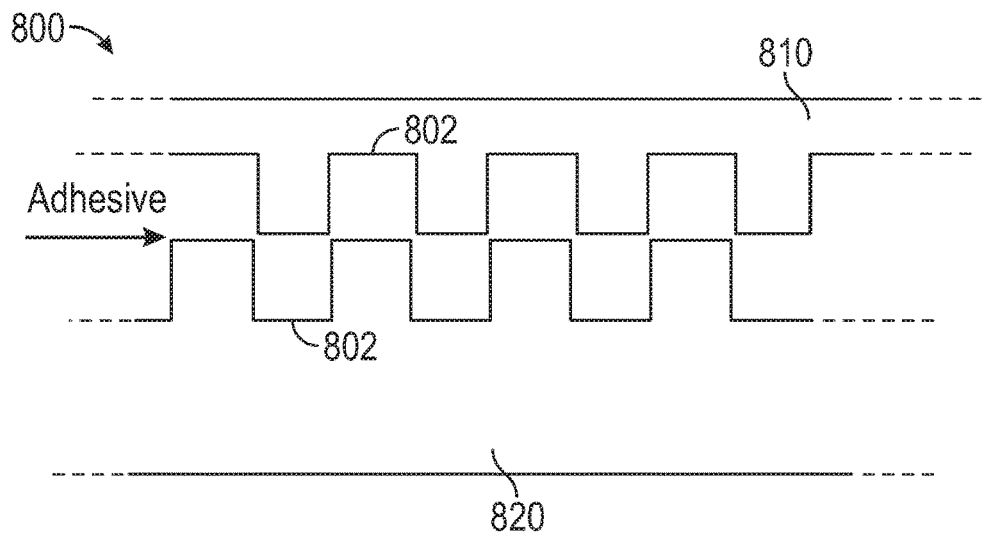
FIG. 8
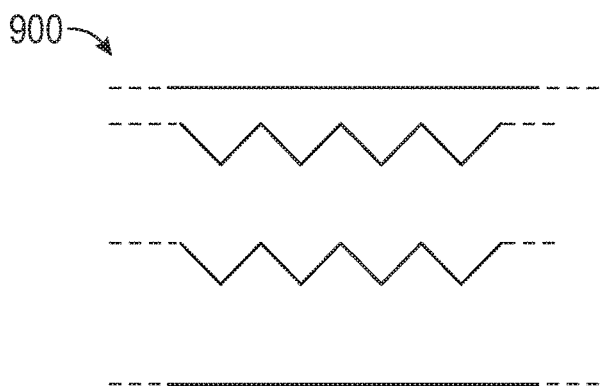
FIG. 9
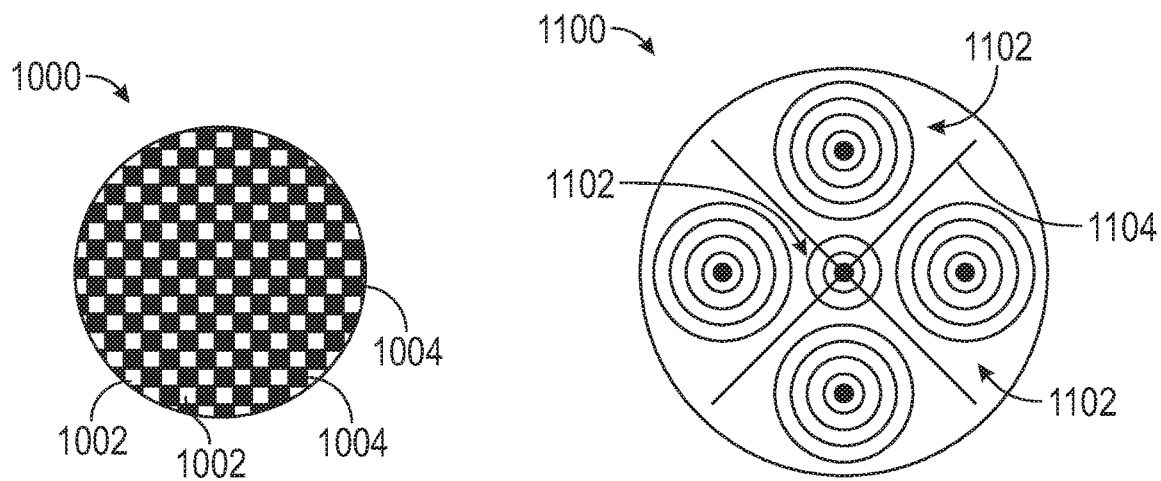
FIG. 10
FIG. 11

YAW PAD ENGAGEMENT FEATURES

CROSS-REFERENCE TO RELATED APPLICATIONS

This application claims the benefit of U.S. Provisional Patent Application No. 62/642,240 filed on Mar. 13, 2018, the entire content of which is hereby incorporated by reference.

BACKGROUND

Wind turbines, especially utility-scale wind turbines, may include a yaw braking system that holds the turbine pointed into the wind, or that otherwise provides a resistance or damping to rotation of the wind turbine. Similar to conventional braking systems, pads or the like (e.g., yaw pads) may be employed to engage with a mating surface of the wind turbine referred to as a slew ring, which may be made of steel or the like. The yaw pads are typically made of a first material for engagement with the slew ring (e.g., a plastic or the like) that is bonded to a backing, which may be made of steel or the like, where the backing is engaged with the yaw piston. For example, yaw pads may be made of a soft metal such as brass, bronze, or similar metal alloys (but it will be understood that yaw pads may also or instead be made of a non-metallic material), while the backing is made of a more rigid material such as steel. Because forces experienced by the yaw pad/slew ring interface are typically quite strong, including a relatively strong pressure and a relatively high coefficient of friction, the bonding of the yaw pads to the backing is often expensive and, even when using such expensive bonding techniques, the bond can fail. Also, the yaw pads themselves often break or wear down under the forces to which they are subjected.

Thus, many wind turbines utilize a gliding yaw bearing arrangement that allows the nacelle to rotate about the wind tower in a smooth and controlled manner. The yaw bearings may absorb large static and dynamic loads and moments during the wind turbine operation, and can provide for smooth rotational characteristics for the orientation of the nacelle under many weather conditions. Such wind turbines may include the General Electric 1.x series of wind turbines that have been in use since approximately 2003. Yaw bearing arrangements often use yaw pads that glide over a surface to provide a controlled degree of resistance to rotation, and yaw pad wear can be a significant issue in all such wind turbine systems. When the yaw pads wear, wind turbine performance can suffer and the wind turbine can make loud noises (sometimes referred to as "fog-horning"), which can be disruptive to people living near a wind turbine or wind farm. This also tends to cause yaw pad vibration, which can degrade the yaw pads by accelerating pad wear and can cause splitting or other damage to the yaw pads.

Lubrication and proper pressure on the yaw pads can be used to reduce the possibility of fog-horning and to extend the life of yaw pads. However, replacing or servicing the yaw pads to lubricate and properly torque the yaw piston assembly for correct pad pressure can be time consuming and expensive. For example, wind turbines may include 12 or 18 yaw pads (more or fewer may be used in any given wind turbine design) that are periodically serviced. To service these yaw assemblies (including yaw pad replacement), lubrication, reassembly, and torqueing can amount to an entire day's work for a crew of at least two technicians. The work is typically carried out inside the nacelle of a wind turbine, which is usually located at an elevated height, and the wind turbine is usually shut down during such service. This not only results in a high cost for the technician's time and equipment, but can also shut down production of electricity (which can be up to about 1.5 megawatts or more during the time that is lost). Thus, a ten-hour maintenance shutdown can cost an operator the service/labor costs plus parts cost plus opportunity costs equaling the value of, e.g., up to 15 megawatt-hours or more of electricity production. In addition, the work needed to service the yaw assemblies can be quite challenging—as stated earlier, this work is often carried out at an elevated height inside a nacelle using tools and parts brought up with the technicians. Also, in many cases the yaw assemblies may be resting in tight spaces that are difficult to access with large tools.

There remains a need for improved yaw pad engagement features for wind turbines.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 8 is an example cross-section of a yaw pad assembly having grooves with a substantially rectangular profile, in accordance with a representative embodiment.

FIG. 9 is an example cross-section of a yaw pad assembly having grooves with a substantially triangular profile, in accordance with a representative embodiment.

FIG. 10 is an example of a checkerboard surface pattern, in accordance with a representative embodiment.

FIG. 11 is an example of a surface pattern using concentric grooves and linear grooves, in accordance with a representative embodiment.

DETAILED DESCRIPTION

Figure 1:
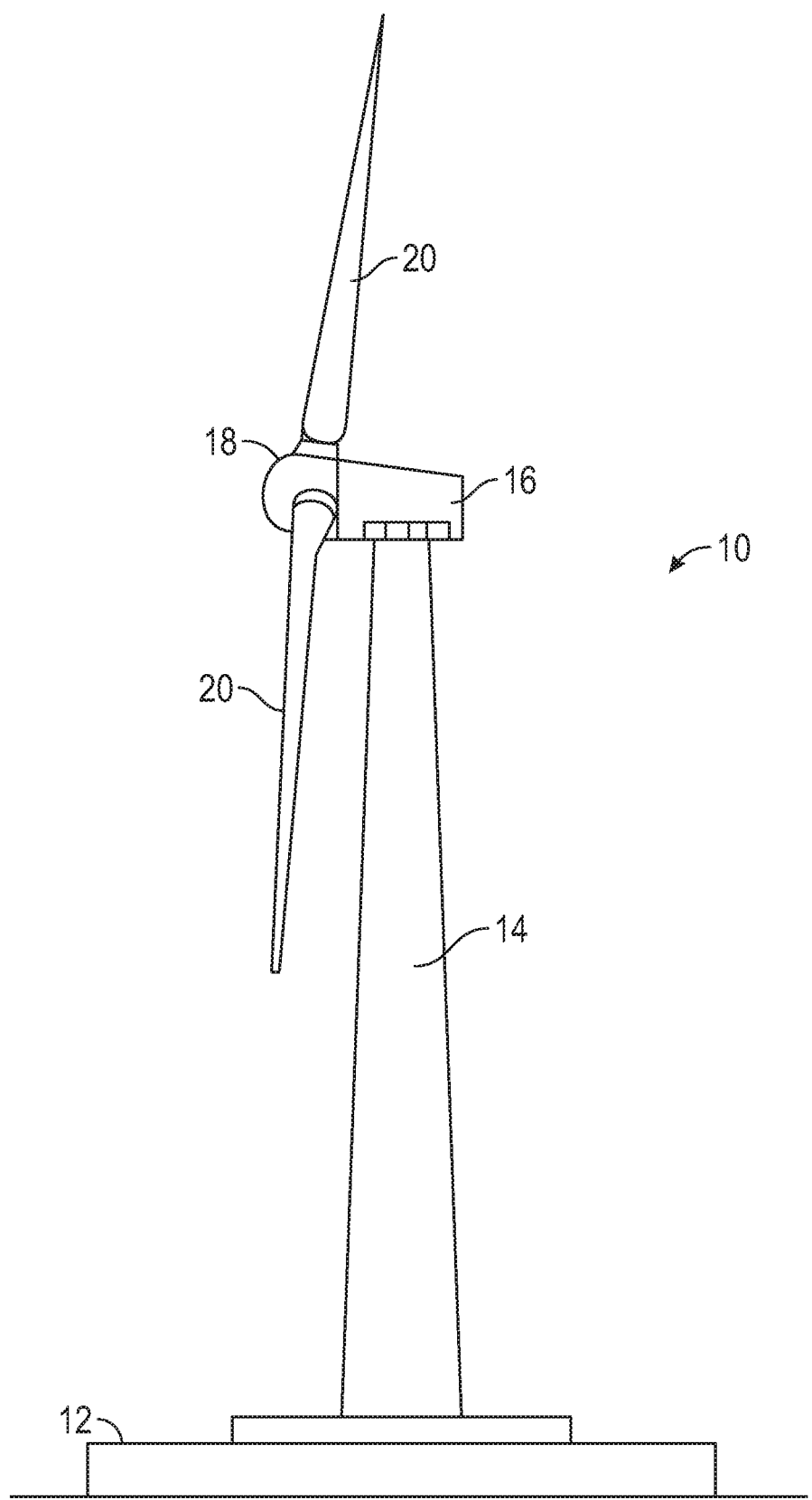
FIG. 1 is an illustration of a wind turbine power generator, in accordance with a representative embodiment.

The various methods, systems, apparatuses, and devices described herein may generally provide for engagement features for yaw pads and, more generally, yaw braking assemblies and systems, e.g., included on wind turbines and the like.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may be configured for, and may include, engagement features for yaw pads included on wind turbines and the like. Thus, for context, several terms related to wind turbines are described below.

A "nacelle" generally refers to a cover housing that houses all or most of the generating components in a wind turbine, including the generator, gearbox, drive train, yaw bearing assembly, brake assembly, and the like.

A "yaw system" of a wind turbine generally refers to the set of components responsible for the orientation of the wind turbine rotor towards the wind.

A "yaw pad" (or yaw bearing, gliding yaw pad, gliding yaw bearing, yaw bearing pad, yaw brake pad, yaw puck, and the like) generally refers to a dry or lubricated pad, often made of a metal such as bronze or a non-metallic composite material, that bears against a bearing surface, usually a large diameter steel disk (e.g., a slew ring) having a gear at the rim. The yaw pad may be used to stabilize rotation of a wind turbine's nacelle and provide smooth rotation of the nacelle into the wind under a wide range of weather conditions.

"Yaw bearing pad material" as used herein generally refers to the material used to make a yaw bearing pad. Such material may include, but is not limited to, brass, bronze, polymers, composites, sintered bronze, sintered metal, polyether ether ketone (PEEK), oil impregnated bronze, layered synthetic fiber reinforced formulations (e.g., having a wear layer of polyester resin and fabric with polytetrafluoroethylene (PTFE) fibers), and the like.

"Non-metallic" generally refers to being made of a material other than metal, but should not preclude something non-metallic from having metal as a component thereof (e.g., metal filings embedded within epoxy would be considered non-metallic for purposes of this document). Similarly, a non-metallic friction pad generally refers to a friction pad made substantially of materials such as polymers, Kevlar™, phenolic resins, organic fibers and particles, ceramics and ceramic particles, a woven polyester material, composites, polyether ether ketone (PEEK), resin impregnated woven polyester and layered synthetic fiber reinforced formulations (e.g., having a wear layer of polyester resin and fabric with polytetrafluoroethylene (PTFE) fibers). This definition is not intended to preclude formulations that include metal filings or other metal particles as a component, but is intended to distinguish over pads that are made entirely of metal or metal alloys per se. Thus, "non-metallic" may refer to materials that are mostly absent of metal.

"Mating parts" may generally refer to parts that when put together fit without significant gaps in at least a major portion of the mating surfaces thereof. Such mating parts may have a relatively small tolerance, e.g., a tolerance that allows for combining the parts together with a thin glue/adhesive line (e.g., a thin glue line may be on the order of 0.10 inches or less in thickness for purposes of this document). Thus, "mating parts" or the like shall be understood to include two or more parts that can be mechanically keyed together.

FIGS. 1-4 are generally provided for context, where the present teachings may be used in conjunction with the features shown and described in these figures. Further context for the present teachings can be found in, for example, Int'l Pat. App. No. PCT/US2016/031558 (published as WO 2016/183045), which is incorporated by reference herein in its entirety. Also, or instead, further context can be found in Yagi, "Technical Trends in Wind Turbine Bearings," NTN TECHNICAL REVIEW No. 76 (2008), which is incorporated by reference herein in its entirety. Thus, the wind turbines described herein and any components thereof, such as portions of the yaw brakes, may be the same or similar to those described in the foregoing publications.

FIG. 1 shows an illustration of a wind turbine 10 power generator, and is generally provided for context of the present teachings. More specifically, FIG. 1 shows an external view of a wind turbine 10 that could utilize, and benefit from, certain embodiments described herein. The wind turbine 10 includes a tower 14 (or pillar) erected on a foundation 12, a nacelle 16 mounted at the top end of the tower 14, and a rotor head 18 provided on the nacelle 16 in a manner that permits rotation about an axis, e.g., a substantially horizontal axis. A plurality (three, in this embodiment, for example) of turbine blades 20 are attached to the rotor head 18 in a radiating pattern about its rotation axis. Wind striking the turbine blades 20 may cause the rotor head 18 to rotate about the rotation axis, and a generator converts this rotational force to electricity. The turbine blades 20 may be connected to the rotor head 18 in a manner allowing movement with respect to the wind direction, thus making it possible to change pitch angles of the turbine blades 20. In certain embodiments, a wind vane or the like (not shown) detects wind direction and provides wind direction information to a controller such as a programmable logic controller (PLC) to trigger a yaw mechanism in order to adjust the yaw of the nacelle 16.

When the nacelle 16 is positioned on the tower 14 and a yaw bearing assembly (such as those described below) is included, the pressure on each of the individual yaw gliding pads of each yaw bearing assembly may be adjusted to avoid un-even wear of the gliding pads and excessive loading on some sectors of the yaw bearing. To this end, an adjustment mechanism may be provided, which can enable technicians to adjust the contact pressure of each individual gliding element in a controllable and secure manner.

Figure 2:
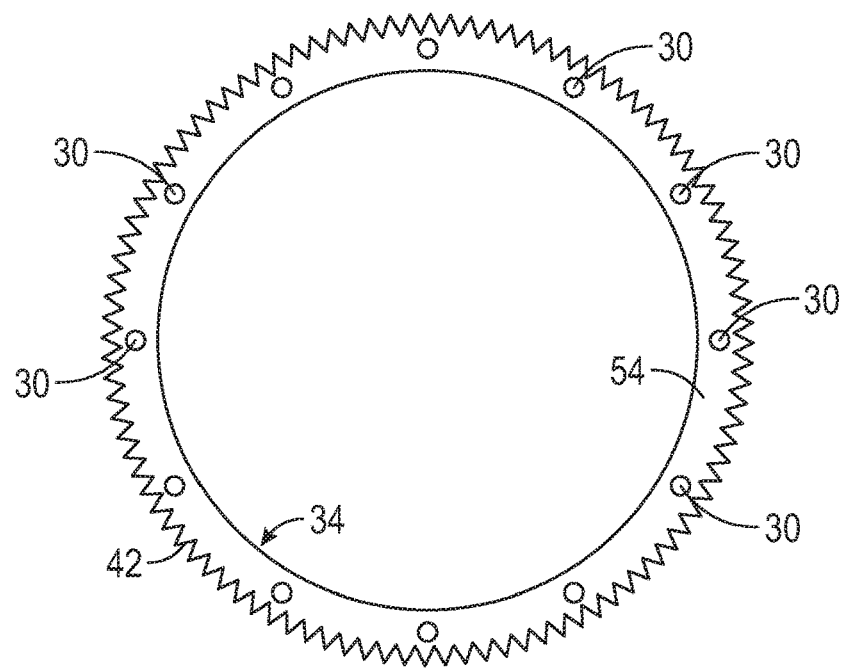
FIG. 2 is an example illustration of the location of yaw bearing assemblies on a slew ring, in accordance with a representative embodiment.

FIG. 2 shows possible locations of yaw bearing assemblies 30 on a slew ring 54, in accordance with a representative embodiment. As depicted in FIG. 2, a wind turbine, such as that shown and described above, may include twelve to eighteen (twelve shown in this figure) yaw bearing assemblies 30 that are arranged around a large gear 34 residing at the junction of the bottom of the nacelle and the top of the tower. These yaw bearing assemblies 30 may be equally spaced (common for systems with eighteen yaw bearing assemblies 30) or unequally spaced (common for systems with twelve yaw bearing assemblies 30). The yaw bearing assemblies 30 may be situated in a substantially circular arrangement. In other examples, eighteen or more or less such yaw bearing assemblies 30 may be provided. These yaw bearing assemblies 30 may include yaw pads 50 (see, e.g., FIG. 3) serving as gliding pads that are in sliding contact with a slew ring 54 (e.g., made of steel or the like) that forms a part of the gear 34 and provides a surface upon which the yaw pads 50 can glide or otherwise engage. The gear 34 may generally have a plurality of teeth 42 at the outer periphery to form a gliding-disk/gear-rim. The teeth 42 may be located at the inner or the outer cylindrical face of the disk, while the arrangement of the yaw bearing assemblies 30 and their exact number and location can vary.

Figure 3:
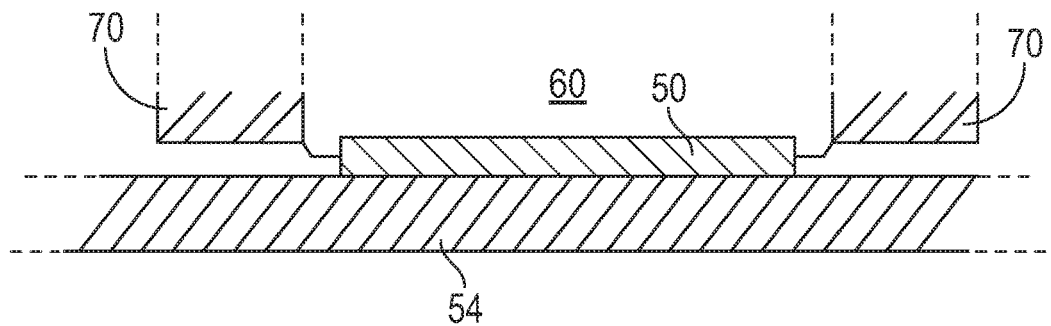
FIG. 3 is an example illustration of a piston pressing a yaw pad into engagement with a slew ring, in accordance with a representative embodiment.
Figure 4:
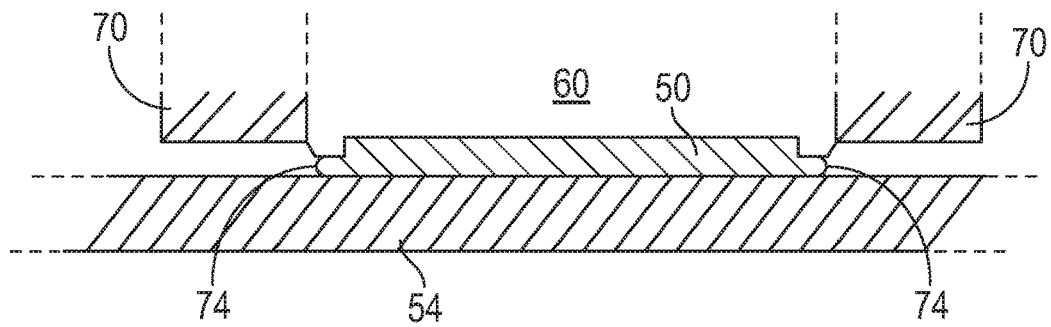
FIG. 4 is an example illustration of deformities in a yaw pad.

FIG. 3 is an example illustration of a piston 60 pressing a yaw pad 50 into engagement with a slew ring 54, in accordance with a representative embodiment. As shown in FIG. 3, the yaw pad 50 may be pressed into a frictional engagement with a surface of the slew ring 54 by the piston 60 (within a cylinder 70) that is driven downward upon the slew ring 54 by a spring or another pressure being applied (e.g., pressure provided by a hydraulic fluid and system).

As previously noted, the yaw pad 50 can be made of polymers, Kevlar™, phenolic resin, organic fibers and particles, composites, polyether ether ketone (PEEK), resin impregnated woven polyester and layered synthetic fiber reinforced formulations (e.g., having a wear layer of polyester resin and fabric with polytetrafluoroethylene (PTFE) fibers), another woven polyester material, combinations thereof, or similar. The yaw pads 50 that are made from some of the aforementioned materials have become popular due to their wear characteristics and generally having a higher coefficient of friction than other pads, e.g., metal pads. However, some non-metallic pads can deform in operation as the nacelle 16 rotates about the slew ring 54. This deformation is shown at areas 74 in FIG. 4 by way of example, and can cause the normally cylindrical yaw pad 50 to thin out and assume more of an oblong or oval face shape leading to reduced life and changes in the force between the yaw pad 50 and the slew ring 54. This problem can be reduced or mitigated by laminating a non-metallic friction surface of the yaw pad 50 to a metal backer plate. However, because there may be a relatively great deal of downward pressure being applied to the yaw pad 50 (e.g., on the order of about 4000-6000 psi), during rotation it may be difficult to achieve a reliable bond between the non-metallic pad and a metallic backer plate that will not separate due to shear forces created when the nacelle rotates.

Figure 5:
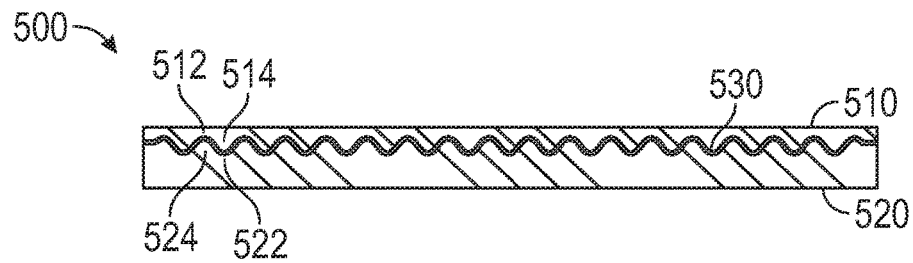
FIG. 5 is an example of a yaw pad using a backer plate and a friction pad, in accordance with a representative embodiment.

Turning now to FIG. 5 et seq., in accordance with the present teachings, the aforementioned problem of pad separation can be addressed by utilizing mating surfaces having an arrangement of raised and lowered patterns (recessed areas and protruding areas) in a yaw pad 500. That is, FIG. 5 is an example of a yaw pad 500 using a backer plate 510 and a friction pad 520, in accordance with a representative embodiment. It will be understood, however, that the friction pad 520 can also or instead be engaged to a yaw piston, which may have a cooperating arrangement of raised and lowered patterns (recessed areas and protruding areas), e.g., to directly engage with the friction pad 520 without a separate backer plate 510. Thus, in the following examples, it will be understood that, in addition to or in lieu of a backer plate 510, a yaw piston itself may include a pattern of alternating recessed areas and protruding areas at a mating surface thereof, e.g., for engaging one or more of the backer plate 510 and the friction pad 520.

As shown in the figure, an arrangement of raised and lowered patterns (recessed areas and protruding areas) may be disposed on a backer plate 510 engaged with a mating arrangement of raised and lowered patterns on a friction pad 520 (e.g., and affixed using an epoxy or other adhesive to hold them together), and/or utilizing an arrangement of raised and lowered patterns (recessed areas and protruding areas) on a yaw piston itself, which is then affixed to a mating arrangement of raised and lowered patterns on the friction pad 520. In this manner, the mating patterns can serve not only to significantly increase the surface area (e.g., to allow for greater adhesion of an epoxy or other adhesive), but the mating patterns can also or instead provide a mechanical structure that is held tightly together (e.g., by the force of a yaw piston) to impede shearing off of the friction pad 520 from the backer plate 510 (or from the yaw piston itself).

In the example of FIG. 5, the backer plate 510 may be made of metal. This metal backer plate 510 may be affixed to a non-metallic friction pad 520 to form the yaw pad 500 (which can be substituted for a more conventional type of pad). The metal backer plate 510 may include a first pattern having at least one recessed area 512 and at least one protruding area 514 in a surface thereof. For example, the metal backer plate 510 may have a first pattern of alternating recessed areas 512 and protruding areas 514 at the mating surface.

The friction pad 520 may include a second pattern having at least one recessed area 522 and at least one protruding area 524 in a surface thereof. For example, the friction pad 520 may have a second mating pattern of recessed areas 522 and protruding areas 524 in its mating surface.

In certain implementations, the friction pad 520 is completely non-metallic. In other implementations, the friction pad 520 may include metal or otherwise incorporate metallic particles therein—e.g., the friction pad 520 may include metal, but may otherwise be mostly non-metallic. In some embodiments, the friction pad 520 includes resin impregnated woven polyester. Other materials are also or instead possible.

The first pattern of the backer plate 510 and the second pattern of the friction pad 520 may be mating patterns such that at least one recessed area 512 of the first pattern receives at least one protruding area 524 of the second pattern, and at least one recessed area 522 of the second pattern receives at least one protruding area 514 of the first pattern. For example, all recessed areas 512 of the first pattern may receive all protruding areas 524 of the second pattern, and all recessed areas 522 of the second pattern may receive all protruding areas 514 of the first pattern.

The yaw pad 500 may further include an adhesive 530 that bonds the first pattern with the second pattern. For example, in a yaw pad assembly, the metallic backer plate 510 can be attached by an adhesive 530 such as a two-part epoxy to the non-metallic friction pad 520. In this example, once the epoxy has cured, the completed yaw pad 500 may be ready for use. Thus, the adhesive 530 may include a two-part epoxy. In other examples, two coats of a thermal setting glue (e.g., that is applied and baked to cure) are suitable for use as an adhesive 530. When forming the yaw pad 500, any adhesive 530 that squeezes out of the sides of the yaw pad 500 can be wiped away before curing, or cut away after curing. The adhesive 530 may form an adhesive layer between the first pattern and the second pattern with the adhesive layer being less than about 0.10 inches in thickness at any point.

Figure 6:
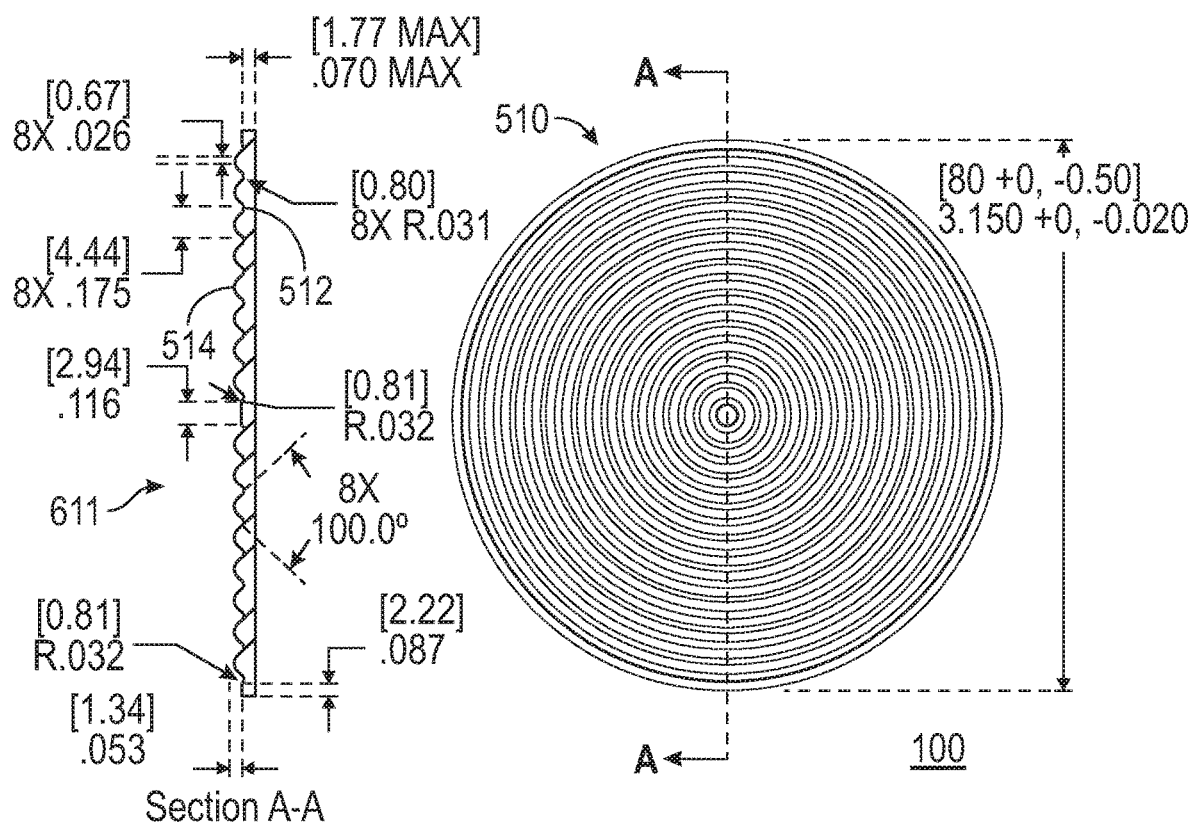
FIG. 6 is a detailed illustration of an example backer plate, in accordance with a representative embodiment.
Figure 7:
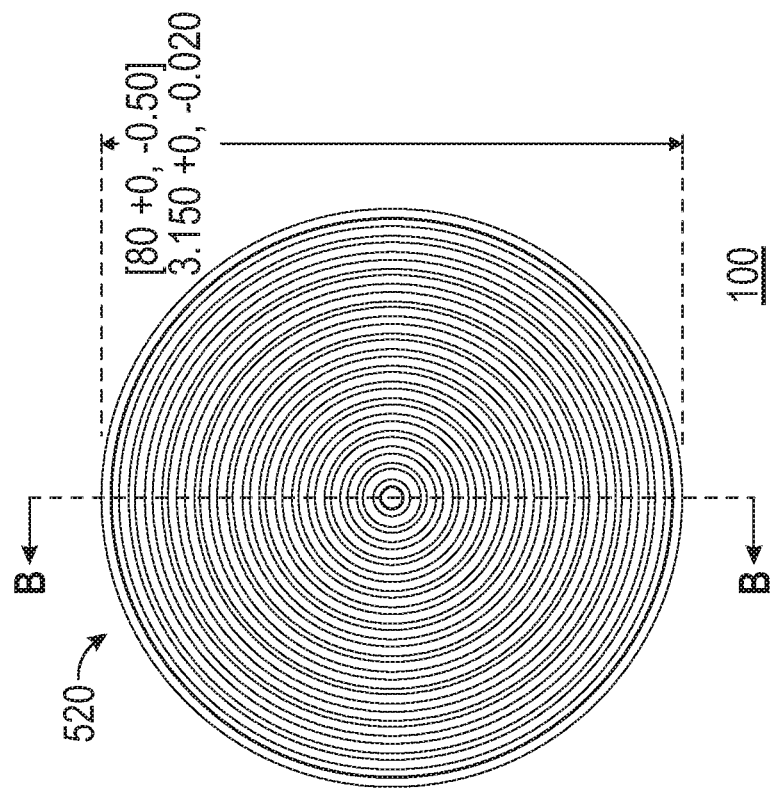
FIG. 7 is a detailed illustration of an example friction pad, in accordance with a representative embodiment.
Figure 7:
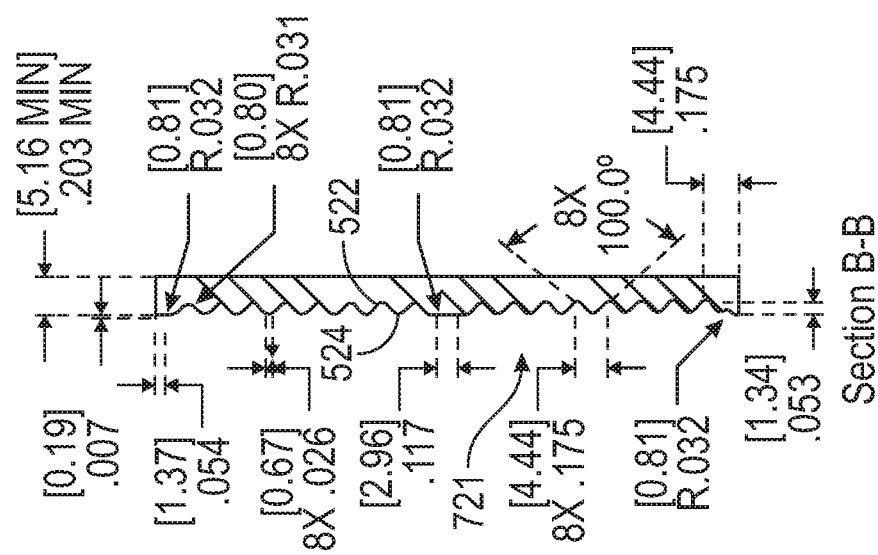

FIGS. 6 and 7 show enhanced detail of the first and second patterns, where FIG. 6 is a detailed illustration of an example backer plate 510 and FIG. 7 is a detailed illustration of an example friction pad 520, in accordance with representative embodiments. Each of these figures also includes a cross-section of the particular component of the yaw pad 500, respectively, with their respective patterns formed of recesses and protrusions. That is, FIG. 6 includes a cross-section of Section A-A in the figure, and FIG. 7 includes a cross-section of Section B-B in the figure. Exemplary dimensions are also provided (where the dimensions in millimeters are shown in brackets and the dimensions in inches are shown without brackets), but it will be understood that other dimensions and patterns are also or instead possible, and that the particular sizes and patterns shown are provided by way of example and not of limitation.

Also, and as discussed herein, although FIG. 6 is described as showing an example of a backer plate 510, it will be understood that the first pattern 611 as shown in FIG. 6 may instead be included on a yaw piston or another component structurally configured for engagement with a friction pad 520.

As shown in FIGS. 6 and 7, one or more of the first pattern 611 of the backer plate 510 and the second pattern 721 of the friction pad 520 may include a set of concentric, substantially circular grooves. For example, each of the first pattern 611 and the second pattern 721 may include a set of concentric, substantially circular grooves—e.g., they may be formed wholly of a pattern having such circular grooves. By way of example, at least one of the first pattern 611 and the second pattern 721 may incorporate an arrangement of eight concentric, substantially circular grooves. As shown in these figures, one or more grooves in the set of concentric, substantially circular grooves may include a rounded substantially triangular cross-sectional shape. The recessed areas of one or more of the first pattern 611 and the second pattern 721 may also or instead have a cross-section that includes shapes such as one or more of a rectangle, a rectangle having chamfered corners, a rectangle having curved corners, a triangle, a polygon, or a smooth curve. It will be understood that other shapes are also or instead possible.

In general, one or more of the mating patterns may exhibit no pointed features that are approximately parallel to an unpatterned, adjacent surface. By way of example, the first pattern 611 may lack any pointed features that are approximately parallel to an unpatterned surface of the backer plate 510. In this manner, a pattern may lack overhangs that would define gaps when mated to a corresponding surface.

By using patterns (such as those shown in FIGS. 6 and 7) in the mating surfaces of the backer plate 510 and the friction pad 520, the surface area for mating can be substantially increased resulting in improved adhesive effectiveness. In certain implementations, the first pattern and the second pattern can provide an increase in surface area of the mating patterns over an unpatterned surface of at least 10%, or of at least 15%. For example, using the patterns shown in FIGS. 6 and 7, the surface area for mating may be increased on the order of 15-20% over that of a flat surface.

Examples of the manufacturing of a yaw pad 500 according to FIGS. 5-7 will now be discussed, but other manufacturing techniques are also or instead possible. In one example, the friction pad 520 is made by placing a circular pad made of a resin impregnated woven polyester material on a lathe and cutting concentric ridges into the surface to achieve the dimensions shown in FIG. 7. A backer plate 510, in this example, may be produced by cutting a slice of cold-rolled steel to the thickest dimension shown in FIG. 6 and then using a lathe to cut mating concentric ridges into the surface at the dimensions specified in FIG. 6. These mating parts may then be attached together using, for example, two coats of thermal setting adhesive 530 and placed under a relatively high pressure for the adhesive 530 to cure in an oven. The edges may then be cleaned-up by cutting away any excess adhesive 530. By way of example, the friction pad 520 and the backer plate 510 may be placed under about 20,000 pounds of force during the curing process.

Continuing with this example, the metal backer plate 510 may be machined (e.g., using a lathe) or otherwise fabricated so as to have eight concentric ridges (i.e., the peaks that form the protruding areas 514), that are each surrounded by valleys that form the recessed areas 512 as shown in FIG. 6. These ridges and valleys can mate with corresponding valleys and ridges (the recessed areas 522 and the protruding areas 524 of FIG. 7, respectively) that are machined or otherwise fabricated in the friction pad 520. In this example, the ridges and valleys in both components may include a somewhat rounded triangular shape, but other shapes are also or instead possible without departing from the scope of the present teachings. For some similar arrangements, tests have been conducted that indicate that the shear strength required to separate this laminate approached five tons. This may be about 2.5 times the shear strength of a laminate without such mating ridges and valleys.

In accordance with the present teachings, the patterns formed on the mating surfaces of the backer plate 510 (or the yaw piston itself) may conform closely to the mating pattern formed in the friction pad 520. In so doing, the patterned surface of the friction pad 520 may be in close contact with the patterned surface of the backer plate 510 (or the yaw piston itself) and side-to-side movement (shearing) may be restricted by the actual patterns themselves. In so doing, the strength of an adhesive 530 between the backer plate 510 and the friction pad 520 can become almost irrelevant. Thus, the operational force of a piston pressing the yaw pad 500 against a slew ring may itself prevent the patterns (and thus the components) from disengaging from one another— almost without regard for the strength of the adhesive 530. Hence, at least a portion (preferably the large majority) of the pattern on the backer plate 510 (or the yaw piston itself) and the friction pad 520 may be closely engaged with each other to eliminate the possibility of movement of the backer plate 510 (or the yaw piston itself) with respect to the friction pad 520 in the event of an adhesive 530 failing or being compromised. Also or instead, in certain implementations, the adhesive 530 may be entirely omitted.

In certain embodiments, when the yaw pad 500 is assembled, a thin layer of epoxy or two coats of thermal setting adhesive 530 (or other adhesive 530) may be applied to one or both mating surfaces. Then, the friction pad 520 and the backer plate 510 (or the yaw piston itself) may be brought into a mating engagement where a compressive force may then be applied (e.g., 20,000 pounds of total force in certain examples) so that any adhesive 530 used is allowed to fully or partially cure. The compressive force may then be removed. Excess adhesive 530 can either be wiped off before it cures or trimmed off after curing. It may be preferred that the adhesive layer, when cured, be no greater in thickness at any point than approximately 0.10 inches, but this should not be considered limiting since the actual thickness may be dependent upon the particular adhesive 530 and the particular application technique.

Thus, a yaw pad 500 according to certain embodiments may have a metal backer plate 510 including a first pattern 611 of at least one recessed area 512 and at least one protruding area 514 in a surface thereof. A friction pad 520 may have a second pattern 721 of at least one recessed area 522 and at least one protruding area 524 in a surface thereof. The first pattern 611 and the second pattern 721 may be mating patterns such that the recessed area 512 of the first pattern 611 receives the protruding area 524 of the second pattern 721, and the recessed area 522 of the second pattern 721 receives the protruding area 514 of the first pattern 611. An adhesive 530 may bond the first pattern 611 with the second pattern 721.

In another example, a yaw pad 500 consistent with the present teachings includes a metal backer plate 510 and/or a yaw piston having a first pattern 611 of at least one recessed area 512 and at least one protruding area 514 in a surface thereof. A non-metallic friction pad 520 may have a second pattern 721 of at least one recessed area 522 and at least one protruding area 524 in a surface thereof. The first pattern 611 and the second pattern 721 may be mating patterns of concentric circular grooves having a rounded approximately triangular cross section. The recessed area 512 of the first pattern 611 may receive the protruding area 524 of the second pattern 721, and the recessed area 522 of the second pattern 721 may receive the protruding area 514 of the first pattern 611. An adhesive 530 may bond the first pattern 611 with the second pattern 721.

Many variations will occur to those skilled in the art upon consideration of the present teachings. By way of example, FIG. 8 shows a cross-section of another yaw pad assembly 800 having grooves 802 with a substantially rectangular profile, in accordance with a representative embodiment. That is, with reference to FIG. 8, the mating grooves 802 can be rectangular shaped in both the friction pad 820 and the backer plate 810 (and/or yaw piston) as shown. However, in this example, the actual assembly may be relatively difficult (e.g., if the tolerance is close) than if the shapes were more tapered. Nevertheless, the fabrication and assembly may be similar and performance may also be similar to the embodiments shown in FIGS. 5-7. The pattern in FIG. 8 can also or instead be modified by including chamfers or curves, e.g., applied to the sharper angles of the pattern.

By way of example, if eight such rectangular sets of peaks and valleys are provided in an 80-mm disc with a valley to peak transition every 2.5 mm, and with a distance from valley to peak of 1.34 mm, this patterning will provide on the order of about a 50% greater surface area for adhesion between the backer plate 810 and the friction pad 820. For other similar patterns, an increase in surface area of greater than about 10% can be readily achieved.

FIG. 9 is a cross-section of yet another exemplary yaw pad assembly 900 having grooves with a substantially triangular profile, in accordance with a representative embodiment. That is, another variation is shown in FIG. 9 in which the peaks and valleys are a substantially triangular shape with relatively sharp edges. It will be understood that this shape can be cut as concentric grooves (as shown for example in FIGS. 6 and 7), or it can be provided in other patterns such as that shown in FIG. 10 and FIG. 11.

FIG. 10 is an example of a checkerboard surface pattern 1000, which may be include on one or more of a friction pad, a backer plate, a yaw piston, and the like. For example, the checkerboard pattern 1000 may be superimposed on the mating surfaces of each of a friction pad and a backer plate. In this case, each square can have a desired profile (e.g., rectangular, triangular, curved, and so on) with the mating surface provided with a mating profile that permits the friction pad and the backer plate to mate closely together. For example, in FIG. 10, the light portions 1002 of the checkerboard may represent raised areas of the backer plate and the darkened portions 1004 may represent lower (e.g., machined away) areas of the backer plate. In this example, the mating friction pad may be machined in the opposite manner with enough clearance for the two parts to mate with a relatively close tolerance. The raised and lowered areas can also be reversed.

FIG. 11 is another example of a surface pattern 1100 using concentric grooves and linear grooves, in accordance with a representative embodiment. In particular, FIG. 11 depicts a further example where a suitable groove profile can be formed using a pattern 1100 of multiple concentric circles 1102 and lines 1104 that mate with the opposite profile on another part. In this example, five sets of concentric circles 1102 are utilized along with suitable patterns of lines 1104. The pattern 1100 shown may represent raised areas in one of the friction pad or the backer plate (and/or yaw piston). The opposite pattern of lowered areas may be cut in the corresponding mating part.

Figure 12:
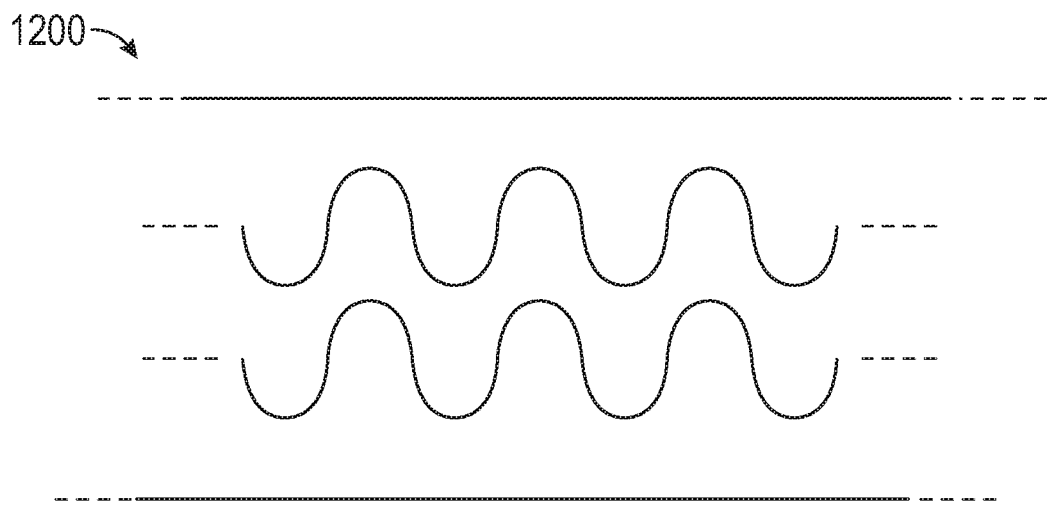
FIG. 12 is an example of a yaw pad assembly having curved groove profiles, in accordance with a representative embodiment.

FIG. 12 is an example of a yaw pad assembly 1200 having curved groove profiles, in accordance with a representative embodiment. By way of example, FIG. 12 shows that the groove profile can also be curved, e.g., resembling a sinusoidal pattern. Many other variations will occur to those skilled in the art upon consideration of the present teachings, where many other variations can be devised, and these examples are provided for illustrative purposes.

Figure 13:
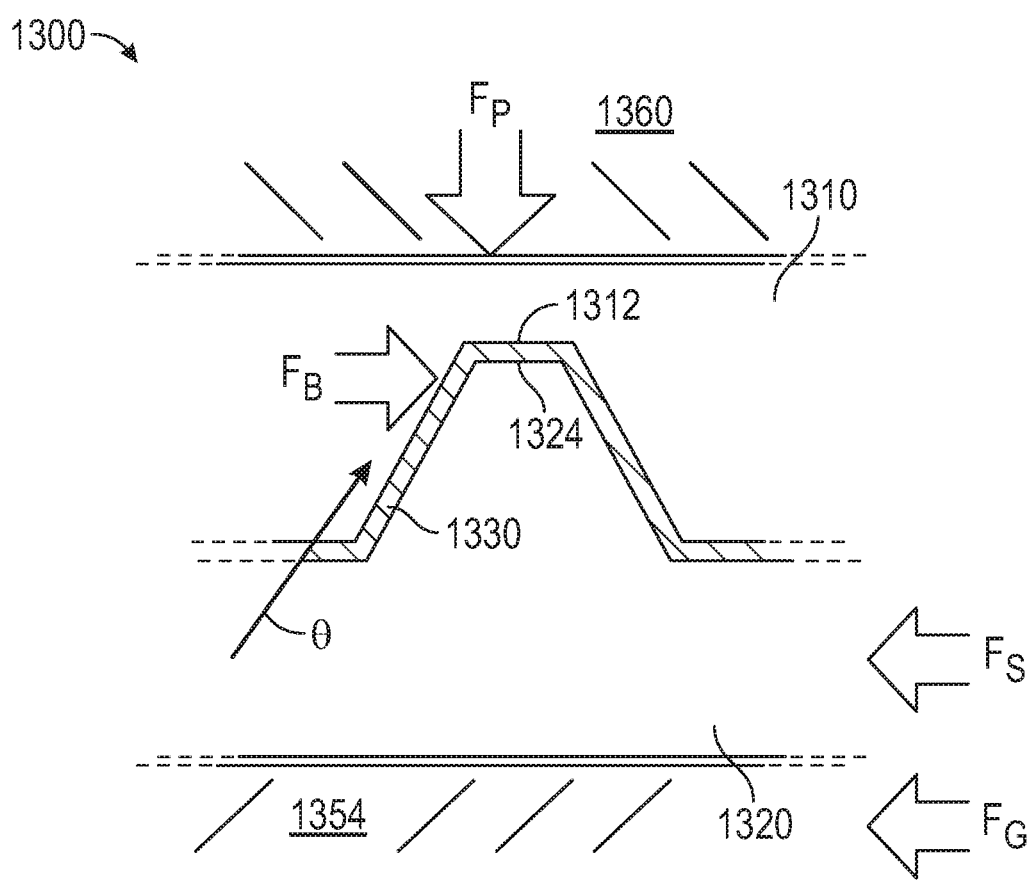
FIG. 13 is a detailed view of a portion of a yaw pad assembly depicting forces encountered during operation, in accordance with a representative embodiment.

FIG. 13 is a detailed view of a portion of a yaw pad assembly 1300 depicting forces that may be encountered in operation, in accordance with a representative embodiment. In particular, FIG. 13 depicts an enlarged cross-section of a trapezoidal shaped ridge and valley arrangement of a yaw pad assembly 1300 where a peak 1324 of a friction pad 1320 mates with a valley 1312 of a backer plate 1310 (or yaw piston itself). A thin line of adhesive 1330, which is shown exaggerated for clarity (similar to the adhesive 530 of FIG. 5), is also depicted, but for purposes of this analysis the size of the space between the peak 1324 and the 1312 that is occupied by the adhesive 1330 could be ignored as insignificant—i.e., as some embodiments may completely lack any such spaces or gaps. As shown, the yaw pad assembly 1300 may be installed into a yaw bearing or braking assembly so as to be pressed into frictional engagement with a slew ring 1354. This engagement may be maintained by a force $F_P$ applied by a piston 1360 to urge the face of the friction pad 1320 into contact with the slew ring 1354. In operation, the downward force $F_P$ is commonly in the range of about 3500 psi to about 4500 psi.

When a nacelle is rotated about the slew ring 1354, shearing forces may be exerted on yaw pad assembly 1300, and more particularly, on the friction pad 1320. The rotational force of the nacelle against the slew ring 1354 can be represented by the force shown as $F_G$, which, due to the relatively high-level of downward force, $F_P$, transfers a large amount of the force $F_G$ to the friction pad 1320 as force $F_S$. This force, $F_S$, may be opposed by force $F_B$ (because the backer plate 1310 is held rigidly in place at the interface of the backer plate 1310 and the piston 1360). These opposing forces may be shear forces that would tend to cause the friction pad 1320 to separate from the backer plate 1310 if there were only a flat horizontal interface between these two elements. However, as shown, because the backer plate 1310 and the friction pad 1320 may be mated together using the mated peaks 1324 and valleys 1312 (again considering the thickness of the adhesive 1330 as negligible), any shearing of the friction pad 1320 at the lamination may require both failure of the adhesive 1330 and movement of the backer plate 1310 in relation to the friction pad 1320 along the direction of arrow θ. That is, the backer plate 1310 would have to ride up the slope of the ridge with the peak 1324 of the friction pad 1320 to essentially cause a decoupling of the friction pad 1320 and the backer plate 1310. But, this movement along direction θ (in this example) may be strongly opposed by the vertical component of the downward force $F_P$ making delamination highly unlikely even if the adhesive 1330 completely fails. Of course, it may be desirable to also have a strong, temperature tolerant adhesive joint to provide further resistance to delamination.

Hence, with a mating structure/pattern provided, which should neither compromise the friction pad 1320 by cutting or tearing it (e.g., by having somewhat horizontal pointed features such as a hook or barb or point), the downward pressure $F_P$ may keep the friction pad 1320 and the backer plate 1310 (or yaw piston itself) tightly laminated. Further, if the patterning in the mating surfaces extends to near the edge of the friction pad 1320, deformation of the friction pad 1320 may be minimized. Such deformation may be further minimized by the presence of the backer plate 1310 (e.g., made of steel or the like), which can reduce the effective thickness of the friction pad 1320 thereby reducing the susceptibility to horizontal deformation.

It is further noted that the patterning of the surface of backer plate 1310 may be carried out by a machining process that cuts or grinds, but does not bend the material of the backer plate 1310 (e.g., metal), since a bending operation can reduce the material's integrity at the location of the bend. This could result in failure of a surface feature when large horizontal forces (as discussed above) are applied to a friction pad 1320.

It may further be desirable for the patterning to exclude holes passing fully through the backer plate 1310 so as to prevent adhesive 1330 from flowing onto the rear (unmated) surface of the backer plate 1310. Adhesive 1330 on the rear surface of the backer plate 1310 can cause the friction pad 1320 to not fully contact the piston 1360 across the full surface thereof. This can result in the tilting of the yaw pad assembly 1300 in place, which can result in uneven wear. The adhesive 1330 can also adhere to the piston 1360 causing difficulty in servicing and replacement. The machining process may also lack a punching operation that could result in holes, which might deform the rear surface of the backer plate 1310.

Figure 14:
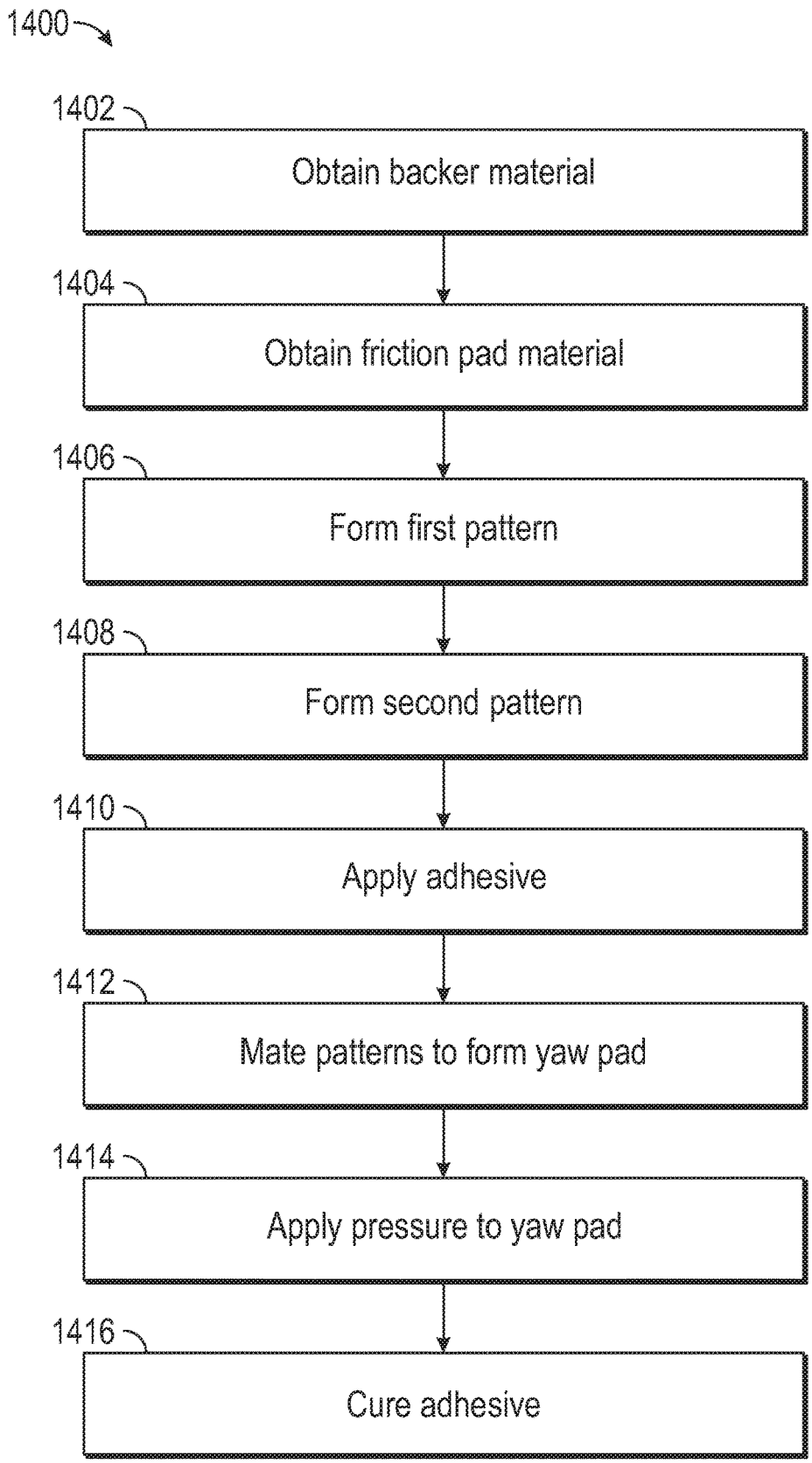
FIG. 14 is a flow chart depicting a method for fabricating a yaw pad assembly, in accordance with a representative embodiment.

FIG. 14 is a flow chart depicting a method 1400 for fabricating a yaw pad assembly, in accordance with a representative embodiment. Thus, in accordance with certain teachings herein, a yaw pad can be fabricated using the process outlined in FIG. 14.

As shown in box 1402, the method 1400 may include obtaining a piece of backer material of a predetermined diameter and thickness. This may include providing, receiving, or fabricating a backer plate from the piece of material, e.g., metal material. In certain implementations, this may include obtaining a circular piece of metal of a prescribed diameter and thickness, for example, by slicing a thickness from a cold-rolled steel (CRS) rod (or hot-rolled steel, other steel, or another suitable material, metal or otherwise) of appropriate diameter and/or by laser cutting, stamping, saw cutting, abrasive water jet cutting, and so on, from a sheet of material having an appropriate thickness. Also, or instead, the diameter can be machined to the appropriate size if need be (e.g., to about 80 mm).

It will be understood that obtaining a piece of backer material may include simply obtaining a yaw piston, which may form the mating surface for a friction pad or yaw pad in certain implementations. In other words, a mating pattern may be formed directly on an end of a yaw piston, where a friction pad having a cooperating mating pattern can be engaged directly to the end of the yaw piston.

As shown in box 1404, the method 1400 may include obtaining a piece of a friction pad material of a predetermined diameter and thickness. This may include providing, receiving, or fabricating a friction pad from the piece of friction pad material, which may be a non-metallic material. Thus, in certain implementations, a substantially circular piece of friction pad material of prescribed diameter and thickness is provided in the method 1400.

As shown in box 1406, the method 1400 may include forming a first pattern into a bottom surface (i.e., a surface that will be directed toward a friction pad when configured for use) of the piece of backer material to form a backer plate. Thus, in certain implementations, a first prescribed pattern is machined into one surface of a substantially circular piece of metal to form a backer plate.

As shown in box 1408, the method 1400 may include forming a second pattern into a top surface (i.e., a surface that will be directed toward a yaw piston when configured for use) of the friction pad material. The second pattern may be structurally configured to mechanically key with the first pattern on the backer plate or yaw piston. Thus, in certain implementations, a second pattern is cut into one surface of the friction pad material, where the first pattern is a mating pattern for the second pattern. The patterning, i.e., forming one or more of the first pattern and the second pattern, can be carried out using a lathe or other machining technique.

As shown in box 1410, the method 1400 may include applying an adhesive to at least one of the bottom surface (of the backer plate or yaw piston) and the top surface (of the friction pad). Thus, in certain implementations, an adhesive is applied to at least one of the patterned surfaces, where the adhesive may include two coats of a thermal setting glue.

As shown in box 1412, the method 1400 may include mating the bottom surface (of the backer plate or yaw piston) and the top surface (of the friction pad) by mechanically keying the first pattern with the second pattern thereby forming a yaw pad.

As shown in box 1414, the method 1400 may include applying pressure to the yaw pad. This may be accomplished mechanically or manually.

As shown in box 1416, the method 1400 may include curing the adhesive. If excess adhesive squeezes out, it can be cut away (or wiped away) after pressure is applied to join the two parts.

Thus, a method of manufacturing a yaw pad may involve providing a substantially circular piece of metal of a prescribed diameter and thickness; providing a substantially circular piece of non-metallic friction pad material of prescribed diameter and thickness; patterning a first prescribed pattern into one surface of the substantially circular piece of metal to form a backer plate; patterning a second prescribed pattern into one surface of the friction pad material; the first prescribed pattern being a mating pattern for the second prescribed pattern; applying adhesive to at least one of the patterned surfaces; mating the patterned surface of the friction pad with the patterned surface of the metal backer plate; applying pressure to urge the pattern of the friction pad into mating engagement with pattern of the metal backer plate; and curing the adhesive. In accord with certain example embodiments, providing a substantially circular piece of metal involves cutting a slice from a bar of metal, or cutting or punching a disc from a sheet of metal. In accord with certain example embodiments, the patterning is carried out using a lathe.

Thus, a yaw pad according to the present teachings may have a metal backer plate with a first pattern of at least one recessed area and at least one protruding area in a surface thereof. A friction pad may have a second pattern of at least one recessed area and at least one protruding area in a surface thereof. The first pattern and the second pattern may be mating patterns such that the recessed area of the first pattern receives the protruding area of the second pattern, and the recessed area of the second pattern receives the protruding area of the first pattern. An adhesive may bond the first pattern with the second pattern. In other implementations, a metal backer plate is omitted, and the yaw pad engages directly with the yaw piston, where the yaw piston has a machined surface including a first pattern that engages with a machined surface of the yaw pad that has a second pattern cooperating with the first pattern so that they can be mechanically keyed together.

Figure 15:
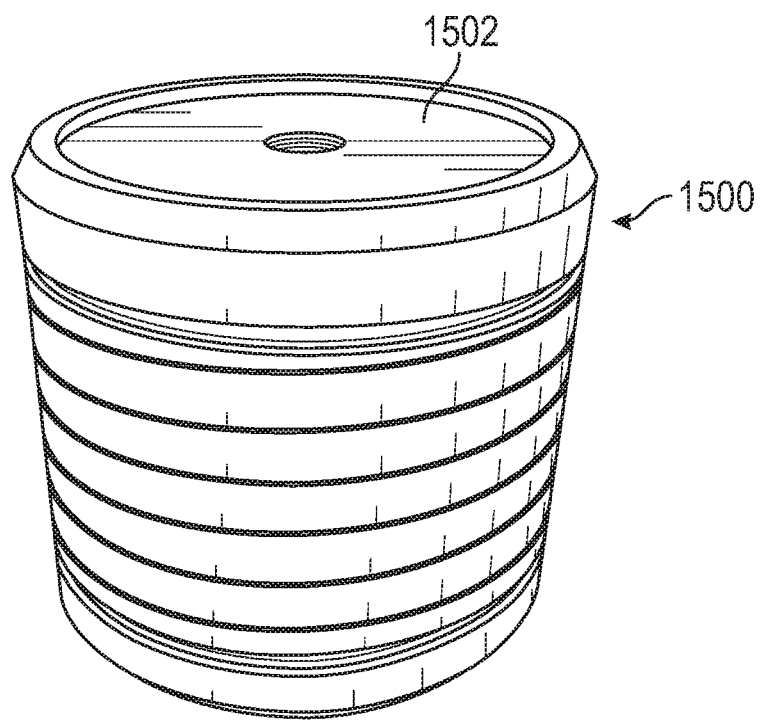
FIG. 15 illustrates a yaw piston.
Figure 16:
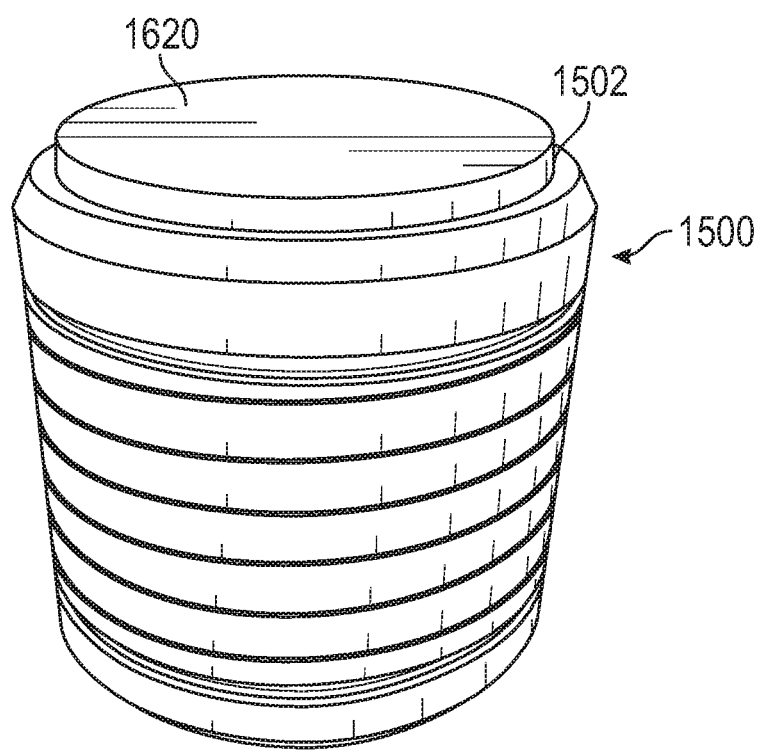
FIG. 16 illustrates a yaw piston and a yaw pad.
Figure 17:
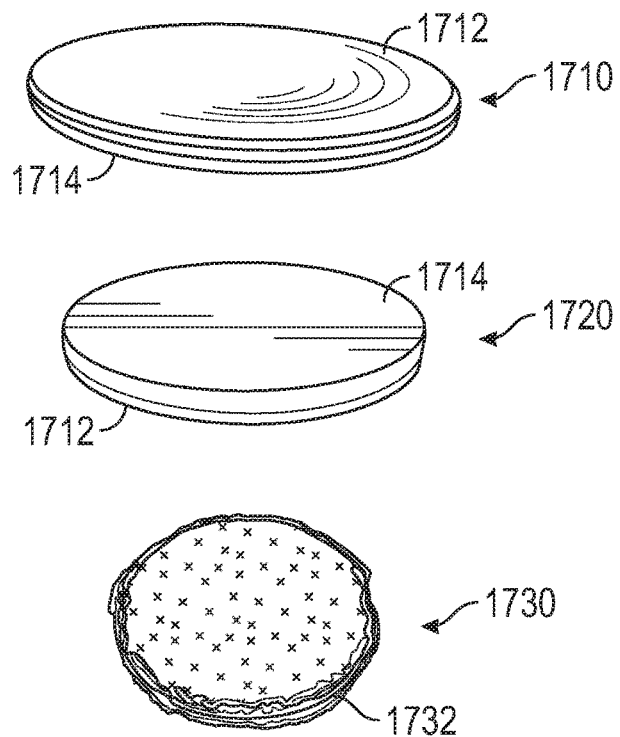
FIG. 17 illustrates yaw pads.

As described below, FIGS. 15-17 illustrate yaw pistons and yaw pads for further context and understanding of the present teachings.

Specifically, FIG. 15 illustrates a yaw piston 1500. The yaw piston 1500 may be a bronze piston (e.g., an OEM piston) with an about 80-mm diameter counterbore 1502 that is about 3-mm deep. In certain implementations, the counterbore 1502 itself may include the first surface with the first pattern as described herein. Also, or instead, the counterbore 1502 may be structurally configured to receive at least a portion of a backer plate or the like that includes the first surface with the first pattern.

FIG. 16 illustrates a yaw piston 1500 (which may be the same or similar to that shown in FIG. 15) and a yaw pad 1620. Specifically, the figure shows a bronze piston with a yaw pad 1620 installed therein, e.g., within the counterbore 1502 of the yaw piston 1500.

FIG. 17 illustrates yaw pads—a first yaw pad 1710, a second yaw pad 1720, and a third yaw pad 1730. The first yaw pad 1710 shows an engagement surface 1712 exposed, where the engagement surface 1712 is disposed opposite a contact surface 1714, which is the surface structurally configured for contacting a slew ring of a wind turbine in operation. The engagement surface 1712 may be structurally configured to engage with one or more of a backer plate and a yaw piston, e.g., where the engagement surface 1712 can have a mating pattern cut therein that is structurally configured to mechanically key to a corresponding mating pattern on one or more of the backer plate and yaw piston. The second yaw pad 1720 shows an contact surface 1714 exposed, and thus the second yaw pad 1720 may simply represent the same pad as the first yaw pad 1710, but it is turned-over. The third yaw pad 1730 shows damage 1732 and/or wear, which demonstrates a circumstance in which certain advantages of the present teachings may be desired. For example, the present teachings may mitigate such damage 1732. The present teachings may also or instead ease maintenance for yaw pads, yaw pistons, or yaw break systems generally.

Figure 18:
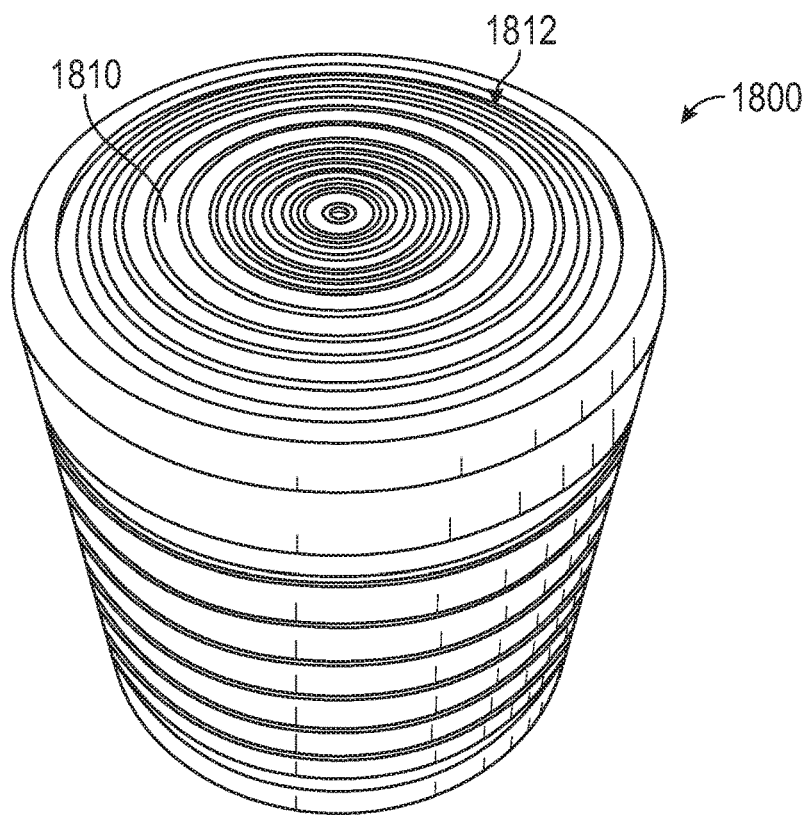
FIG. 18 illustrates a yaw piston, in accordance with a representative embodiment.

FIG. 18 illustrates a yaw piston 1800, in accordance with a representative embodiment. As shown in the figure, the yaw piston 1800 may include a first surface 1810 disposed on an end thereof, where the first surface 1810 includes a first pattern 1812 formed of concentric rings or the like. A yaw pad (not shown in this figure) may cooperate with this first pattern 1812—i.e., a yaw pad may include a second surface with a cooperating second pattern for mating with, and mechanically keying with, the first surface 1810 included on an end of the yaw piston 1800.

Figure 19:
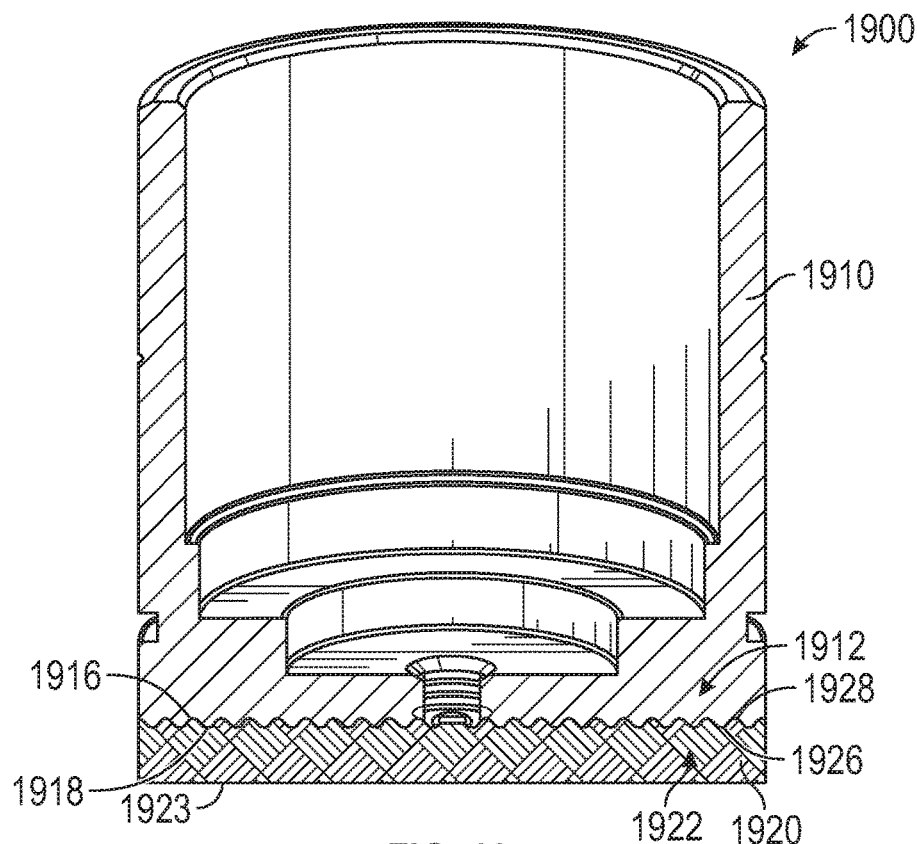
FIG. 19 illustrates a yaw piston and a yaw pad, in accordance with a representative embodiment.

FIG. 19 illustrates a yaw piston 1910 and a yaw pad 1920, in accordance with a representative embodiment. The yaw piston 1910 and the yaw pad 1920 may together form a part of a yaw brake apparatus 1900 for a wind turbine.

The yaw brake apparatus 1900 may include a first surface 1912 disposed on an end of the yaw piston 1910. In certain implementations, the first surface 1912 is integral with the yaw piston 1910. In other implementations, the first surface 1912 is disposed on a backing plate that is connected to the end of the yaw piston 1910. The first surface 1912 may include a first pattern formed by one or more of a plurality of first recesses 1916 and a plurality of first protrusions 1918.

The yaw pad 1920 may include a second surface 1922 structurally configured to engage with the first surface 1912, and a third surface 1923 opposite the second surface 1922 that is structurally configured to engage with a slew ring of the wind turbine. The second surface 1922 may include a second pattern formed by one or more of a plurality of second recesses 1926 and a plurality of second protrusions 1928 corresponding to one or more of the plurality of first recesses 1916 and the plurality of first protrusions 1918 on the first pattern such that the first pattern and second pattern fit together when aligned in a predetermined orientation. The predetermined orientation may include a single orientation or a plurality of orientations in which the first pattern and second pattern fit together. Also, or instead, the first pattern and the second pattern may be substantially unique patterns, or they may be repeated and repeatable, known patterns. By way of example, the first pattern and the second pattern may each comprise a set of concentric, substantially circular grooves.

Figure 20:
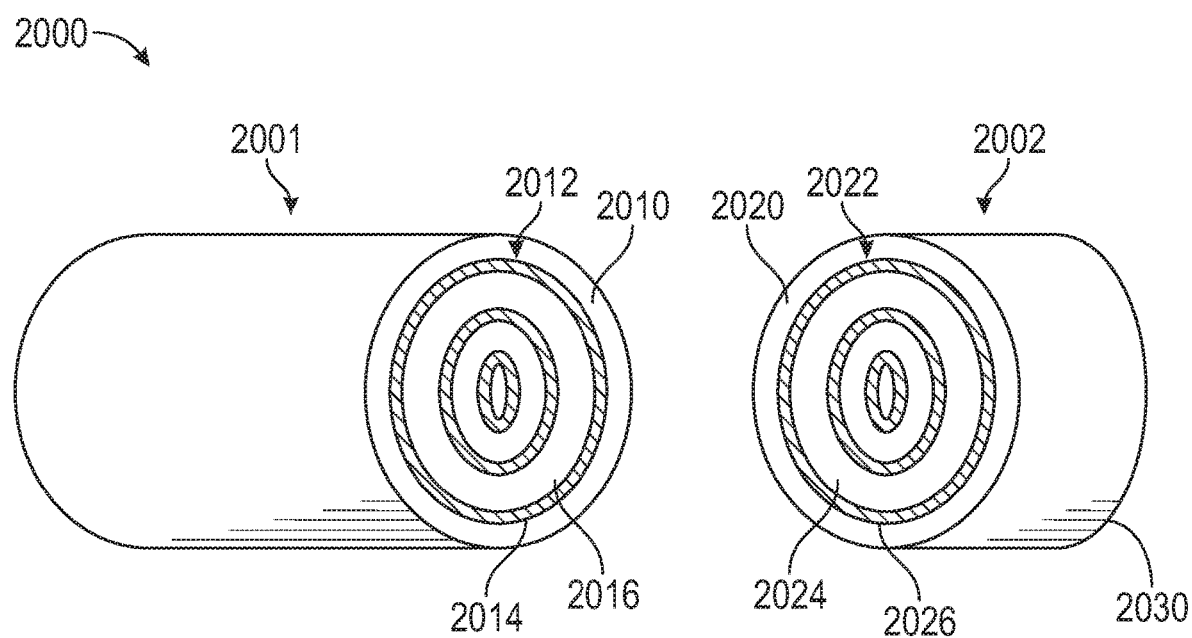
FIG. 20 illustrates yaw pad engagement features, in accordance with a representative embodiment.

FIG. 20 illustrates yaw pad engagement features, in accordance with a representative embodiment. Specifically, the figure shows a yaw brake apparatus 2000, i.e., two components of a yaw brake apparatus 2000—a first component 2001 and a second component 2002.

The first component 2001 may include a yaw piston, a portion thereof, or a component that is structurally configured for connection to the yaw piston or an end thereof. For example, the first component 2001 may include a backing plate that is connected to the end of the yaw piston.

The first component 2001 may include a first surface 2010. As discussed above, the first component 2001 may be a yaw piston, and thus the first surface 2010 may be disposed on an end of a yaw piston for a wind turbine. The first surface 2010 may include a first pattern 2012 formed by one or more of a plurality of first recesses 2014 and a plurality of first protrusions 2016.

The second component 2002 may include a yaw pad. The yaw pad may include a second surface 2020 structurally configured to engage with the first surface 2010 and a third surface 2030 opposite the second surface 2020 that is structurally configured to engage with a slew ring of the wind turbine. The second surface 2020 may include a second pattern 2022 formed by one or more of a plurality of second recesses 2024 and a plurality of second protrusions 2026 corresponding to one or more of the plurality of first recesses 2014 and the plurality of first protrusions 2016 on the first pattern 2012 such that the first pattern 2012 and second pattern 2022 fit together when aligned in a predetermined orientation.

In certain implementations, one or more of the first pattern 2012 and the second pattern 2022 may be etched or otherwise machined into the surfaces in which they are disposed. One or more of the first pattern 2012 and the second pattern 2022 may also or instead be created by adding material onto the surfaces in which they are disposed, e.g., by additive manufacturing such as three-dimensional printing or the like.

Thus, as described herein, implementations may generally include a yaw brake apparatus including a first surface disposed on an end of a yaw piston for a wind turbine (e.g., on the yaw piston itself, or on a component or backing connected thereto), where the first surface includes a first pattern formed by one or more of a plurality of first recesses and a plurality of first protrusions. The yaw brake apparatus may also include a yaw pad having a second surface structurally configured to engage with the first surface and a third surface opposite the second surface that is structurally configured to engage with a slew ring of the wind turbine. The second surface may include a second pattern formed by one or more of a plurality of second recesses and a plurality of second protrusions corresponding to one or more of the plurality of first recesses and the plurality of first protrusions on the first pattern such that the first pattern and second pattern fit together when aligned in a predetermined orientation. As stated above, the first surface may be integral with the yaw piston or it may be disposed on a backing plate that is connected to the end of the yaw piston. Further, as stated above, one or more of the first pattern and the second pattern may include one or more concentric shapes (e.g., rings or circles) or other patterns for mechanically keying the first surface to the second surface, with or without an adhesive.

Implementations may also or instead generally include a yaw pad including a metal backer plate having a first pattern of at least one recessed area and at least one protruding area in a surface thereof, and a non-metallic friction pad having a second pattern of at least one recessed area and at least one protruding area in a surface thereof, where the first pattern and the second pattern are mating patterns of concentric circular grooves having a rounded approximately triangular cross-section. The recessed area of the first pattern may receive the protruding area of the second pattern, and the recessed area of the second pattern may receive the protruding area of the first pattern. The yaw pad may further include an adhesive that bonds the first pattern with the second pattern.

Implementations may include one or more of the following features. The adhesive may form an adhesive layer between the first pattern and the second pattern with the adhesive layer being less than about 0.010 inches in thickness at any point. The first pattern and the second pattern may provide an increase in surface area of the mating patterns over an unpatterned surface of at least 10%. The first pattern may exhibit no pointed features that are approximately parallel to an unpatterned surface of the backer plate. The friction pad may be comprised of resin impregnated woven polyester.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A yaw brake apparatus, comprising:
   a first surface disposed on an end of a yaw piston for a wind turbine, the first surface comprising a first pattern of concentric circles formed by one or more of a plurality of first recesses and a plurality of first protrusions; and
   a yaw pad comprising a second surface structurally configured to engage with the first surface and a third surface opposite the second surface that is structurally configured to engage with a slew ring of the wind turbine, the second surface comprising a second pattern of concentric circles formed by one or more of a plurality of second recesses and a plurality of second protrusions corresponding to one or more of the plurality of first recesses and the plurality of first protrusions on the first pattern such that the first pattern and second pattern fit together when aligned in a predetermined orientation, the alignment of the first pattern and the second pattern providing resistance to shear forces exerted on the yaw pad by rotation of a nacelle.

2. The yaw brake apparatus of claim 1, where the first surface is integral with the yaw piston.

3. A yaw pad, comprising:
- a metal backer plate having a first pattern of concentric circles on at least one recessed area and at least one protruding area in a surface thereof;
- a friction pad having a second pattern of concentric circles on at least one recessed area and at least one protruding area in a surface thereof;
- the first pattern and the second pattern being mating patterns such that the at least one recessed area of the first pattern receives the at least one protruding area of the second pattern, and the at least one recessed area of the second pattern receives the at least one protruding area of the first pattern, the first pattern and second pattern fit together when aligned in a predetermined orientation, the alignment of the first pattern and the second pattern providing resistance to shear forces exerted on the yaw pad by rotation of a nacelle; and
- an adhesive that bonds the first pattern with the second pattern.

4. The yaw pad of claim 3, where each of the first pattern and the second pattern comprise a set of concentric, substantially circular grooves.

5. The yaw pad of claim 4, where one or more grooves in the set of concentric, substantially circular grooves comprises a rounded triangular cross-sectional shape.

6. The yaw pad of claim 3, where the adhesive forms an adhesive layer between the first pattern and the second pattern with the adhesive layer being less than about 0.10 inches in thickness at any point.

7. The yaw pad of claim 3, where at least one of the first pattern and the second pattern incorporates an arrangement of eight concentric, substantially circular grooves.

8. The yaw pad of claim 3, where the first pattern and the second pattern provide an increase in surface area of the mating patterns over an unpatterned surface of at least 10%.

9. The yaw pad of claim 8, where the first pattern and the second pattern provide an increase in surface area of the mating patterns over an unpatterned surface of at least about 15%.

10. The yaw pad of claim 3, where the first pattern exhibits no pointed features that are approximately parallel to an unpatterned surface of the metal backer plate.

11. The yaw pad of claim 3, where the adhesive comprises a two-part epoxy.

12. The yaw pad of claim 3, where the friction pad is comprised of resin impregnated woven polyester.

13. The yaw pad of claim 3, where the friction pad is non-metallic.

14. The yaw pad of claim 3, where the friction pad incorporates metallic particles.

15. The yaw pad of claim 3, where the recessed areas of the first pattern and the second pattern have a cross-section shaped as one or more of a rectangle, a rectangle having chamfered corners, a rectangle having curved corners, a triangle, a polygon, or a smooth curve.

16. A method of manufacturing a yaw pad, comprising:
- obtaining a piece of backer material of a predetermined diameter and thickness;
- obtaining a piece of a friction pad material of a predetermined diameter and thickness;
- forming a first pattern of concentric circles into a bottom surface of the piece of backer material to form a backer plate;
- forming a second pattern of concentric circles into a top surface of the friction pad material, where the second pattern is structurally configured to mechanically key with the first pattern;
- applying an adhesive to at least one of the bottom surface and the top surface;
- mating the bottom surface and the top surface by mechanically keying the first pattern with the second pattern thereby forming the yaw pad, where the first pattern and second pattern fit together when aligned in a predetermined orientation, the alignment of the first pattern and the second pattern providing resistance to shear forces exerted on the yaw pad by rotation of a nacelle;
- applying pressure to the yaw pad; and
- curing the adhesive.

17. The method of claim 16, where the obtaining a piece of backer material comprises one or more of cutting a slice from a bar of metal, and cutting or punching a sheet of metal.

18. The method of claim 16, where forming one or more of the first pattern and the second pattern is carried out using a lathe.

* * * * *